(12) United States Patent
Bieswanger et al.

(10) Patent No.: US 8,028,183 B2
(45) Date of Patent: Sep. 27, 2011

(54) POWER CAP LOWER BOUND EXPLORATION IN A SERVER ENVIRONMENT

(75) Inventors: Andreas Bieswanger, Ehningen (DE); Thomas M. Brey, Cary, NC (US); Ajay Dholakia, Cary, NC (US); Andrew Geissler, Pflugerville, TX (US); Hye-Young McCreary, Liberty Hill, TX (US); Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/212,806

(22) Filed: Sep. 18, 2008

(65) Prior Publication Data

US 2010/0070787 A1 Mar. 18, 2010

(51) Int. Cl.
*G06F 1/00* (2006.01)
*G06F 1/26* (2006.01)
*G06F 1/32* (2006.01)
*G06F 1/04* (2006.01)
*G06F 1/12* (2006.01)
*G06F 15/16* (2006.01)

(52) U.S. Cl. ......... 713/322; 713/300; 713/320; 713/375

(58) Field of Classification Search .................. 713/300, 713/310, 320, 321, 322, 323, 324, 330, 340
See application file for complete search history.

(56) References Cited

U.S. PATENT DOCUMENTS

| 5,954,820 | A | 9/1999 | Hetzler | |
| 6,553,501 | B1* | 4/2003 | Yokoe | 713/320 |
| 6,647,501 | B1* | 11/2003 | Ninomiya | 713/320 |
| 6,906,550 | B2 | 6/2005 | Dreps et al. | |
| 7,149,605 | B2 | 12/2006 | Chassin et al. | |
| 7,219,245 | B1* | 5/2007 | Raghuvanshi | 713/322 |
| 7,506,189 | B1* | 3/2009 | Lee et al. | 713/322 |
| 2002/0099514 | A1* | 7/2002 | Watts, Jr. | 702/132 |
| 2007/0006006 | A1* | 1/2007 | Henson | 713/322 |
| 2007/0176641 | A1 | 8/2007 | Kursun et al. | |
| 2008/0222435 | A1 | 9/2008 | Bolan et al. | |

OTHER PUBLICATIONS

Author(s): Barry Lawson, Evgenia Smirni; Title: Power-aware Resource Allocation in High-end Systems via Online Simulation; Item: article; Date: Jun. 2005; pp. 10; Publisher: ICS; Location: Boston, MA, USA.

Author(s): Jianli Zhuo, Chaitali Chakrabarti, Kyungsoo Lee, Naehyuck Chang; Title: Dynamic Power Management with Hybrid Power Sources; Item: article; Date: Jun. 2007; pp. 6; Publisher: DAC; Location: San Diego, CA, USA.

(Continued)

*Primary Examiner* — Thomas Lee
*Assistant Examiner* — Samantha Hoang
(74) *Attorney, Agent, or Firm* — Robert C. Rolnik; Libby Z. Toub

(57) ABSTRACT

Disclosed is a computer implemented method, computer program product, and apparatus for determining a safe lower bound for a commonly powered data processing system. A power management module operates the data processing system using at least one nominal operating parameter during an exploration periodicity, with the at least one nominal operating parameter being clock speed. The power management module determines whether a calibration period is occurring. The power management module calibrates the data processing system up to a measurement interval duration expiration. The power management module may repeat operating the data processing system using the at least one nominal operating parameter.

17 Claims, 6 Drawing Sheets

OTHER PUBLICATIONS

Author(s): Yi Zhu, Jianjua Liu, Haikun Zhu, Chung-Kuan Cheng; Title: timing-Power Optimization for Mixed-Radix Ling Adders by Integer Linear Programming; Item: article; Date: Jan. 2008; pp. 7; Publisher: IEEE; Location: La Jolla, CA, USA.

Author(s): Mahasweta Sarkar, Rene L. Cruz; Title: A MAC Layer Power Management Scheme for Efficient Energy Delay Tradeoff in a WLAN; Item: article; Date: Oct. 10, 2007; pp. 28; Volume-Issue: vol. 51-Issue 14; Publisher: Elsevier B.V.; San Diego, CA, USA.

* cited by examiner

POWER CAP LOWER BOUND EXPLORATION IN A SERVER ENVIRONMENT

BACKGROUND OF THE INVENTION

1. Field of the Invention

The present invention relates generally to a computer implemented method, data processing system, and computer program product for collecting server statistics. More specifically, the present invention relates to sampling power consumption statistics during typical high-load periods such that a power limit or power cap is discovered that a server, as configured, does not surpass.

2. Description of the Related Art

Modern data centers may be placed in dense urban areas. Some may be placed in high-rise buildings. Architecture and geography may limit the power available at a data center. These constraints may limit the number of servers that can be placed in the data center.

In the past, system administrators to such data centers would make educated guesses as to the maximum power consumption for each server. For each server, a system administrator would select a capped power usage, or power cap, that applies to a given server. A power management module (PMM) can throttle a server that approaches or exceeds the applicable power cap for that server. A PMM apportions a net power limit among the devices of a target system. Accordingly, a PMM may be a data processing system that communicates with components within a rack or other electronic enclosure that monitors power use, and instructs each device to moderate consumption as needed.

In designing and planning growth of a data center, a system administrator allocates to each server, power on a worst-case scenario basis. In the system administrator's mind, the combined power consumption of all servers during the worst-case scenario must be below the rated capacity of a power line that feeds the data center. Otherwise, over-current circuit protection may be triggered, such as, for example, a circuit breaker.

Control of each server's maximum power can be provided by an energy manager application that may control power to each server through a power management module (PMM) coupled to each to a server. The energy manager and/or the PMM provides a graphical user interface for power management. Thus, a system administrator is permitted a range of power cap limitations between a minimum and a maximum limit on a scale of watts within a graphical user interface. A power cap is a limit set by a user or determined by a data processing system to apply to a server. The power cap may be an educated guess or a calculation concerning a likely expected maximum power that a server may require. The power cap can be used as a planning tool to determine how much of a data center's power budget is already allocated to servers in the data center. The power cap can be used as a threshold for a server to self-determine dangerous over-use of power, and accordingly throttle back power consumption when the threshold is approached or surpassed.

The lower limit and upper limit are called, pcapmin and pcapmax, respectively. Setting a power cap close to the pcapmax, can provide the system administrator a high assurance that the power will not be throttled back on a server, but at the expense of allocating a larger fraction of the power of the data center to this particular server. Accordingly, a system administrator may be unaware that a particular server, custom configured to the customer's needs, is maxing out at a level well below the power cap. Thus, by over-engineering power to this particular server, the system administrator may be overlooking a surplus of power allocation that could be allocated to a new server.

The system administrator, absent knowledge of surpluses in power allocation versus actual power drawn, cannot place as many servers in a data center as might be available if more realistic power caps were placed on each server.

SUMMARY OF THE INVENTION

The present invention provides a computer implemented method, computer program product, and apparatus for determining a safe lower bound for a commonly powered data processing system. A power management module operates the data processing system using at least one nominal operating parameter during an exploration periodicity, with the at least one nominal operating parameter being clock speed. The power management module determines whether a calibration period is occurring. The power management module calibrates the data processing system up to a measurement interval duration expiration. The power management module may repeat operating the data processing system using the at least one nominal operating parameter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
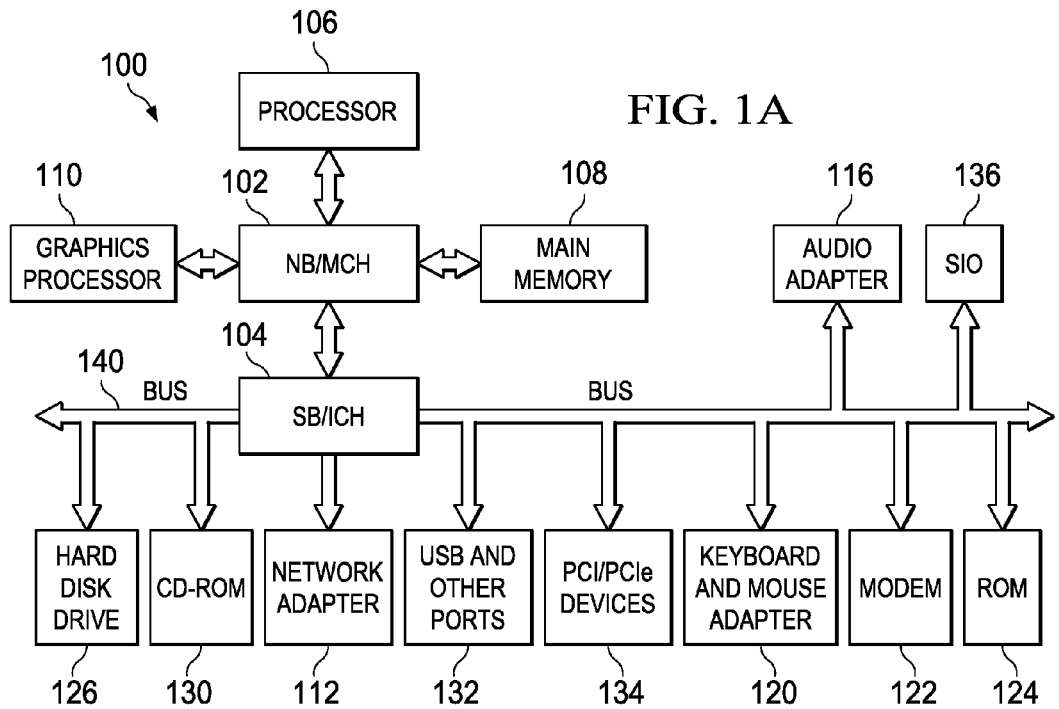
FIG. 1A is a data processing system in accordance with an illustrative embodiment of the invention.

With reference now to the figures and in particular with reference to FIG. 1A, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1A. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1A may vary depending on the implementation. Other internal hardware or peripheral devices, such as flash memory, equivalent non-volatile memory, and the like, may be used in addition to or in place of the hardware depicted in FIG. 1A. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1A is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1B:
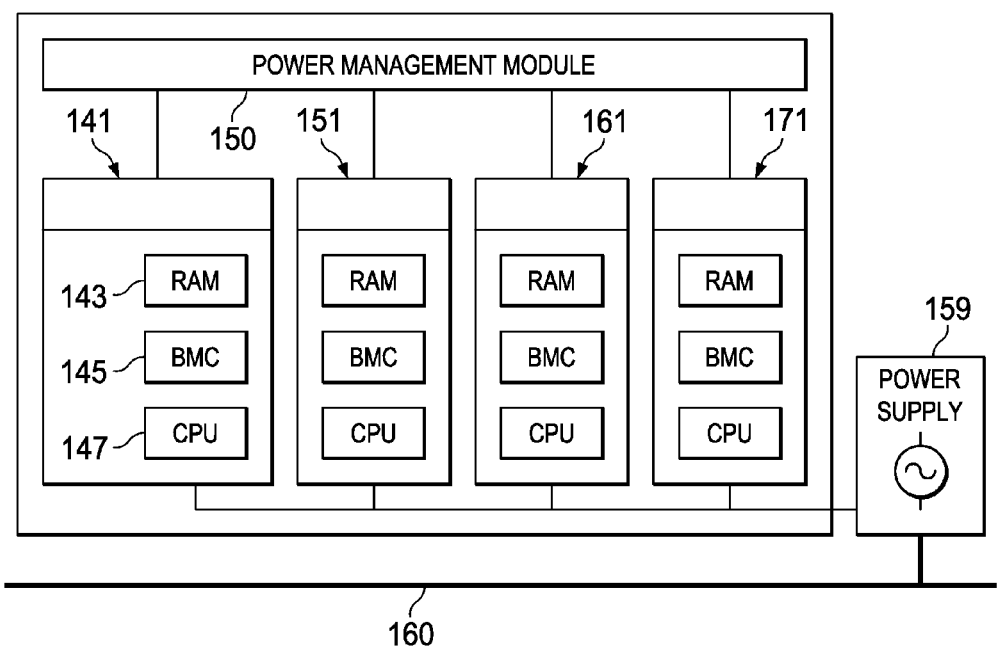
FIG. 1B is a diagram of a blade center in accordance with an illustrative embodiment of the invention.

FIG. 1B is a diagram of a blade center in accordance with an illustrative embodiment of the invention. The blade center may include one or more servers. Each server may be an instance of a data processing system, for example, data processing system 100 of FIG. 1A. In addition to components described in data processing system 100, each server may include a baseboard management controller (BMC). In addition, blade server 141, may include random access memory, RAM 143, baseboard management controller, BMC 145, and central processing unit, CPU 147. Each BMC of a blade server may operate at the control and in coordination with power management module 150. Each BMC may include a circuit to measure energy consumed by its associated blade server. Such energy measurements may be in units, for example, of milliJoules (mJ). In addition, the BMC can provide a power throttling mechanism for its blade server.

Either the application performing the power management function can reside on each BMC or, alternatively, each BMC may be controlled by a power management module (PMM) 150. PMM 150 can be an application that is executed by a data processing system. The PMM may also provide user interface features that permit a system administrator to adjust and control power caps for each server or other component of a data processing system. Power supply 159 may be a power supply that supports the operation of blade server 141, 151, 161, and 171. Power supply 159 may obtain current from data center power conductor 160. Data center power conductor 160 may be protected by a fuse, circuit breaker, or the like, to avoid fire hazards, among other risks.

Figure 1C:
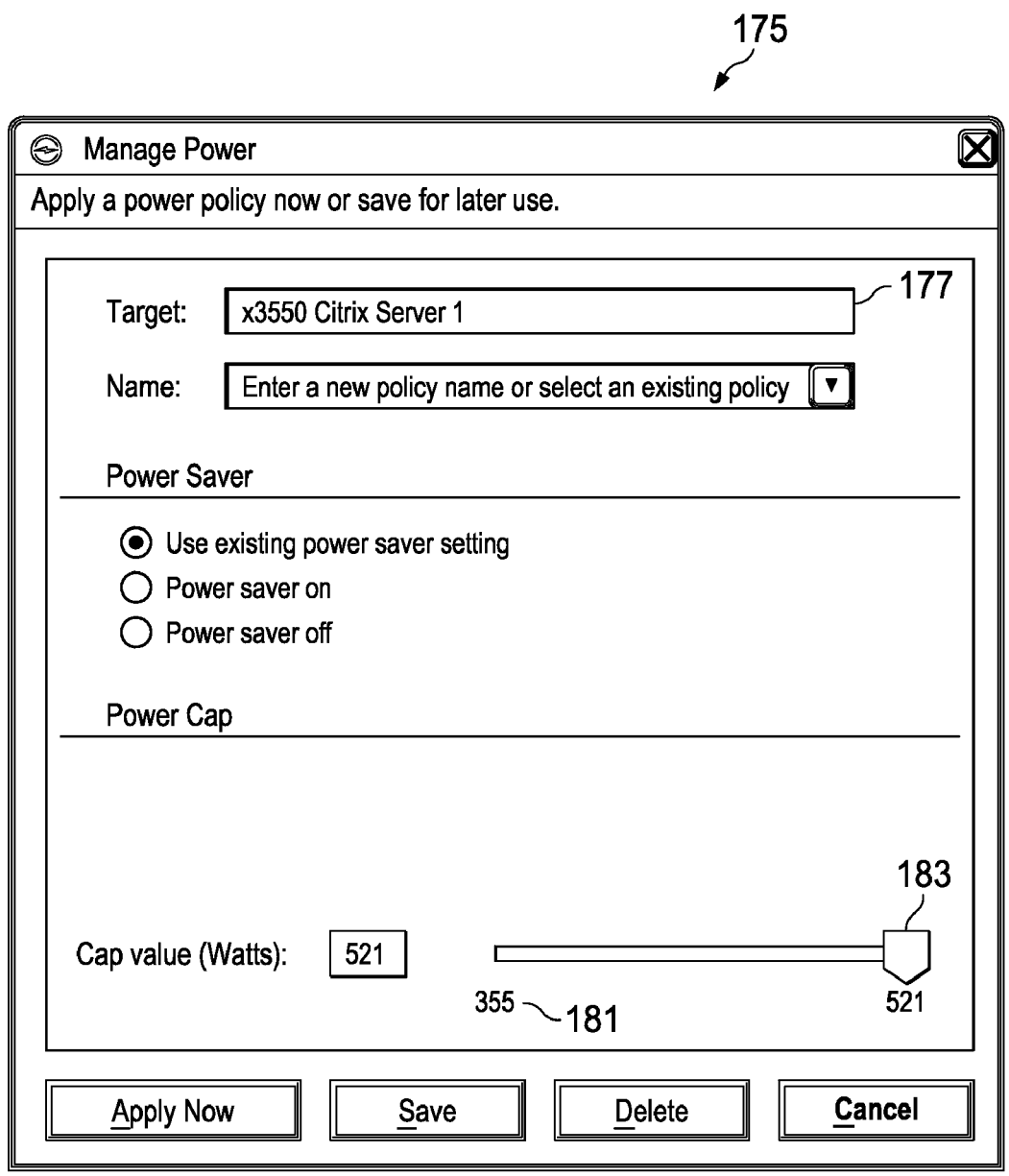
FIG. 1C is a user interface in accordance with an illustrative embodiment of the invention.

FIG. 1C is a user interface in accordance with an illustrative embodiment of the invention. Dialog 175 provides information that a system administrator may use to set a power cap for a server or other data center component. Dialog 175 may be generated by the power management module (PMM). A target field 177 may be used by the system administrator to uniquely identify the server or other component to which a power cap is to apply. Dialog 175 includes minimum power cap 181, pcapmin, and maximum power cap 183, or pcapmax. A minimum power cap is a lower limit to a maximum predicted safe power consumption of a server. Accordingly, the minimum power cap may form a lower bound to a user-selectable range of power caps assigned a server. Safety is a relative term that varies according to the user or situation. Accordingly, a guardband may be established that provides a higher power cap than one determined by collecting statistics concerning a server. A guardband is an additional margin above a calculated maximum power consumption of a server during actual operation.

The aspects of the illustrative embodiments provide a computer implemented method, data processing system, and computer program product for collecting actual power usage of a server while operating applications and handling functionality of a customer. A power management module may obtain samples of data processing system power consumption during high levels of processor utilization. Accordingly, a highest sampled power consumption may be used as a minimum power cap. Embodiments of the invention may periodically re-sample a data processing system power consumption to obtain data at a variety of times of day, for example, during peak activity. The largest power consumption sampled in this manner may operate as a floor or lower bound to setting a power cap for the server. A floor is a lower bound to this range.

Figure 2A:
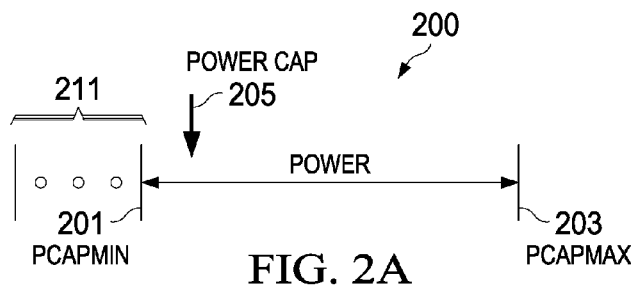
FIG. 2A shows a user-selectable power range that a system administrator may be permitted to select power caps in accordance with an illustrative embodiment of the invention.

FIG. 2A shows a user-selectable power range that a system administrator may be permitted to select power caps in accordance with an illustrative embodiment of the invention. Power range 200 has minimum power cap (PCAPMIN) 201, maximum power cap (PCAPMAX) 203, a user-selected power cap 205 that lies between the minimum power cap and the maximum power cap. In addition, excess range 211 exists below the minimum power cap 201 that may include a surplus power that is not used by a server nor likely to be used by a server while operating according to the customer's configuration. The surplus power may be unknown until an illustrative embodiment of the invention determines a new minimum power cap.

Figure 2B:
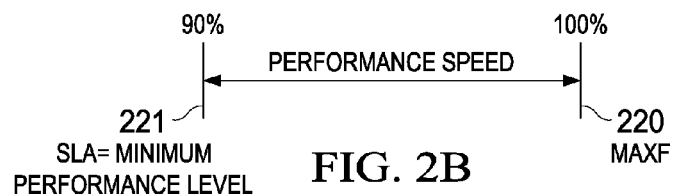
FIGS. 2B and 2C show available speeds of a data processing system in accordance with an illustrative embodiment of the invention.
Figure 2C:
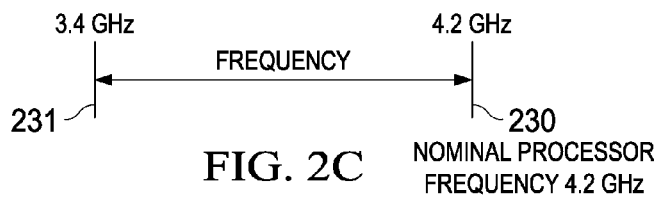

FIGS. 2B and 2C show available speeds of a data processing system in accordance with an illustrative embodiment of the invention. FIG. 2B expresses speed in terms of a fraction of a maximum frequency (MAXF) or full processor clock speed of the one or more processors of the server. A full processor clock speed is a maximum clock speed at which an integrated circuit correctly operates, according to the manufacturer of the integrated circuit. A maximum frequency may be the full processor clock speed. A clock speed or clock rate is a speed that describes the cycles or frequency of a waveform used to clock circuits. A maximum clock rate may be the clock rate that permits a CPU circuit to settle to a new state following a pulse of the clock waveform. Rates higher than the maximum clock rate may leave the CPU circuit in an unreliable or undeterminate state. A customer may operate a server and component processors according to a service level agreement. Such a service level agreement may require that the server perform no slower than a 90% of the maximum frequency or MAXF 220. Accordingly, a lower bound for processor speed is minimum performance level (SLA) 221. Full processor clock speed may be, for example, 4.2 GHz 230. For such a processor, a minimum performance level may be 90%. A minimum performance floor, in this example, corresponds to a 3.78 GHz speed applied to a processor having a full processor clock speed of 4.2 GHz. FIG. 2C depicts the minimum performance level as 3.4 GHz 231. A minimum performance floor can be set to 3.4 GHz, in this example, by using an 81% value for the minimum performance level.

A nominal operating parameter is a user-selectable feature of a circuit that influences a speed that a circuit processes data. Nominal operating parameters include, for example, clock speed of a processor, parameters that control when sub-systems sleep, among others. A processor may be set to operate using a nominal operating parameter. The nominal operating parameter may be a preferred speed for an integrated circuit, for example, the full processor clock speed. A performance floor is a percentage or fraction of the full processor clock speed. The performance floor can be 90%.

Figure 2D:
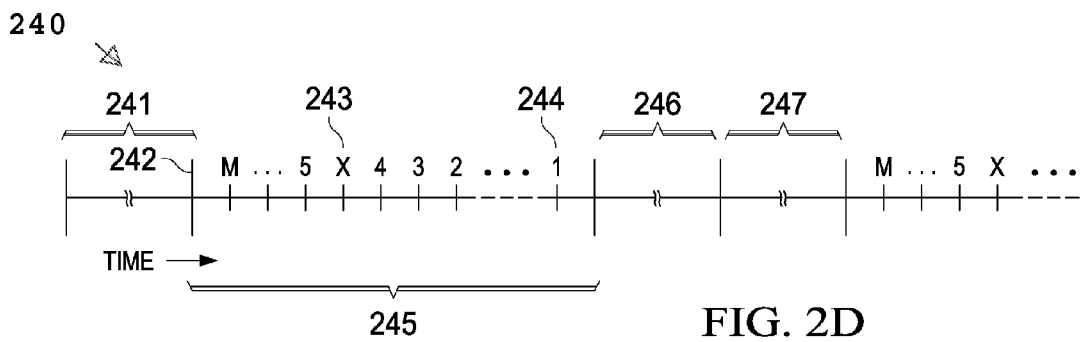
FIG. 2D is an exemplary timeline of exploration periodicity interspersed with calibration periods in accordance with an illustrative embodiment of the invention.

FIG. 2D is an exemplary timeline of exploration periodicity interspersed with calibration periods in accordance with an illustrative embodiment of the invention. Timeline 240 may be dominated by exploration periodicities, 241, 246, and 247. An exploration periodicity is an interval between explorations, during which a data processing system may perform without reductions in performance. The exploration periodicity may be measured by using a counter to count down time intervals until the exploration periodicity has elapsed. Accordingly, a variable, wait time, may be set to equal the exploration periodicity and periodically be decremented until the wait time is 0 or less than zero. During an exploration periodicity, the server can operate using nominal operating parameters. Exploration periodicity may be a user-selectable value, and may be selected to be, for example, five minutes. In which case, exploration of a lower bound for a power cap may occur every five minutes, or longer, if conditions warrant. It is preferred that the exploration periodicity be considerably longer than actual calibration of the server or processor.

When conditions warrant, roughly at the conclusion of an exploration periodicity 242, a power management module (PMM) may obtain samples indexed by a variable, Mk. Accordingly, contemporaneous with each valid sampling of power, the PMM may decrement Mk. Accordingly, Mk is shown initialized to M, and later as a declining value as time progresses. An invalid measurement may occur at time X 243. A final measurement in the calibration period may occur at a time when Mk is 1 244.

Further exploration periodicity 246 follows calibration period 245. After exploration periodicity 246, conditions may be unfavorable for a calibration period. Accordingly, a further exploration periodicity 247 occurs.

Figure 3:
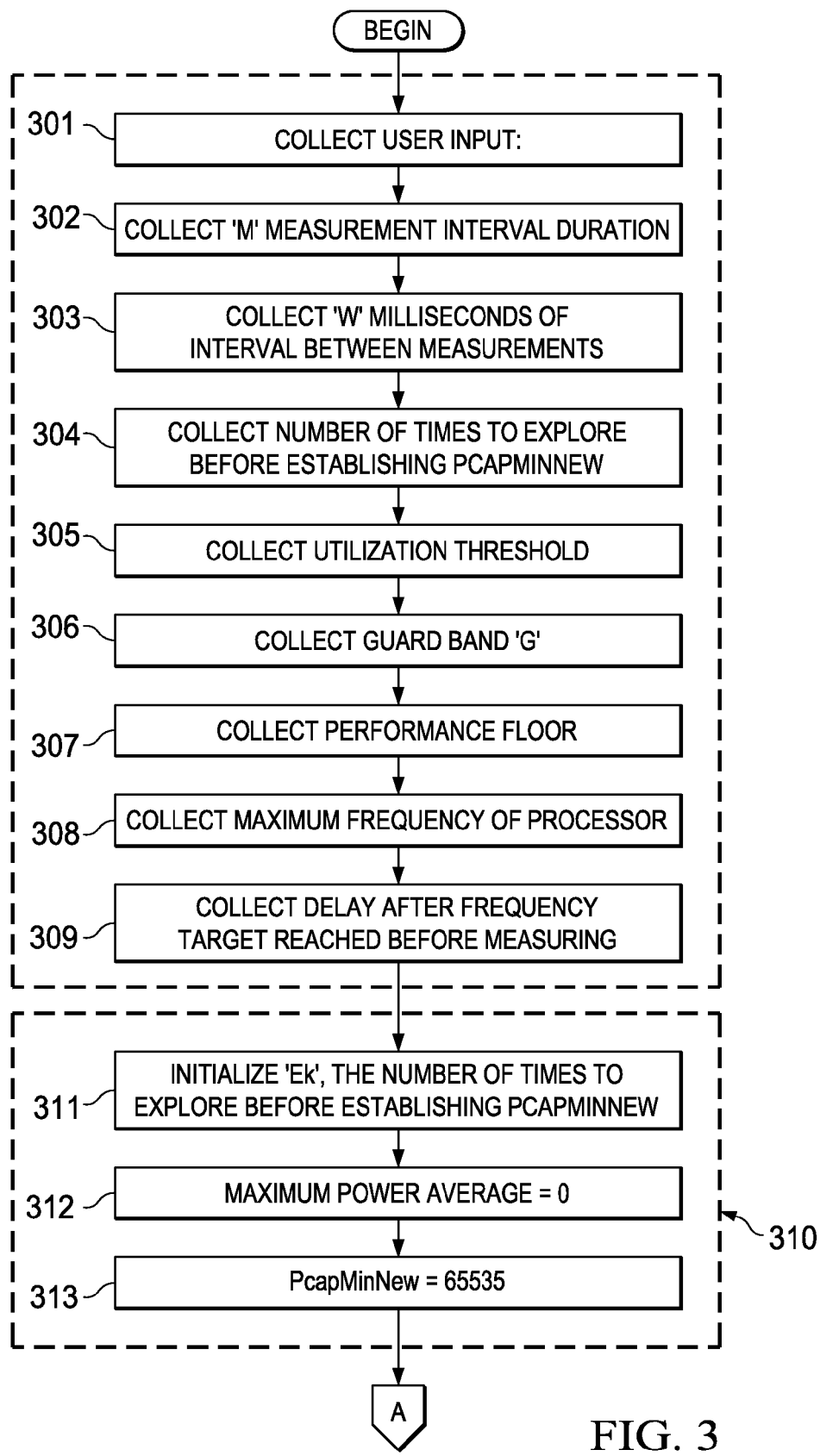
FIG. 3 is a flowchart portion showing collection of user input and initialization of variables in accordance with an illustrative embodiment of the invention.

FIG. 3 is a flowchart portion showing collection of user input and initialization of variables in accordance with an illustrative embodiment of the invention. Initially, PMM collects user input (step 301). Step 301 is a collection of a number of distinct variables, and accordingly, each variable collected may be described as collected in a substep. Substeps are steps that may be more granular than a broader step that encompasses two or more substeps. The PMM collects a measurement interval duration, M (step 302). A measurement interval duration is a sum total of all measured intervals used to accumulate power use during a calibration period. The measurement interval duration may not include any sampling intervals that system utilization fell short of a utilization threshold. Thus, a measurement interval duration expiration may occur at a time that is longer after a measurement interval duration commencement than the measurement interval duration. This extended measurement interval duration expiration may occur when a sampling interval occurs when system utilization is below the utilization threshold. The calibration period is at least the length of a measurement interval duration, though the calibration period may vary depending on how many valid sampling times may exist between exploration periodicities. A calibration period is a period that occurs between exploration periodicities. A data processing system operating during a calibration period may operate at a reduced clock speed, or with another nominal operating parameter reduced from a highest or safe performance speed.

The PMM collects a wait time, W, to wait between attempts to calibrate (step 303). The wait time can be an exploration periodicity. The PMM collects a number of times to explore before establishing a new pcapmin, or a lower bound to a power cap for the applicable server (step 304). The new pcapmin may be stored to a variable called "PCapMinNew". As explained above, in relation to FIG. 2A, embodiments of the invention may discover a comparatively safe value for a minimum power cap within an excess range. The PCapMinNew may be a value within the excess range, determined by successive calibration periods of the server. A variable name for the number of times may be E. Next, the PMM collects the utilization threshold (step 305). A utilization threshold is a system tunable that a system administrator may set as a value to be used in determining whether a criterion to enter a calibration period is met. The PMM collects a guardband, 'G', from the user (step 306). The guardband may be a factor that a maximum average of samples may be multiplied by in order to obtain a safety margin above the highest statistically obtained power consumption. The PMM may collect a performance floor for the server (step 307). The PMM may collect a maximum frequency of the processor (step 308). The PMM may collect a delay after frequency target reached but before measuring value (step 309). This delay or DAFTRBM (delay after frequency target reached before measuring) enables the power waveform to settle as well as be measured at times delayed sufficiently to avoid statistical anomalies caused by noise on the line. When sampling takes place at a frequency greater than the main frequency components of the power spectrum density of the noise, then an average of power independent of noise may be obtained.

Next, the PMM may initialize variables (step 310). A counter, Ek, may be set to the number of times to explore before establishing PCapMinNew (step 311). The maximum power average is initialized to zero (step 312). A maximum power average is a maximum among all power averages determined for a server. The maximum power average may be "PavgMax", which may be revised periodically as described in FIG. 5, below. PCapMinNew is set to a binary representation of 'not available' (step 313). For a two-byte allocation of memory to a variable for PCapMinNew, the binary representation of 'not available' may be, for example 65535. Processing may continue to FIG. 4.

Figure 4:
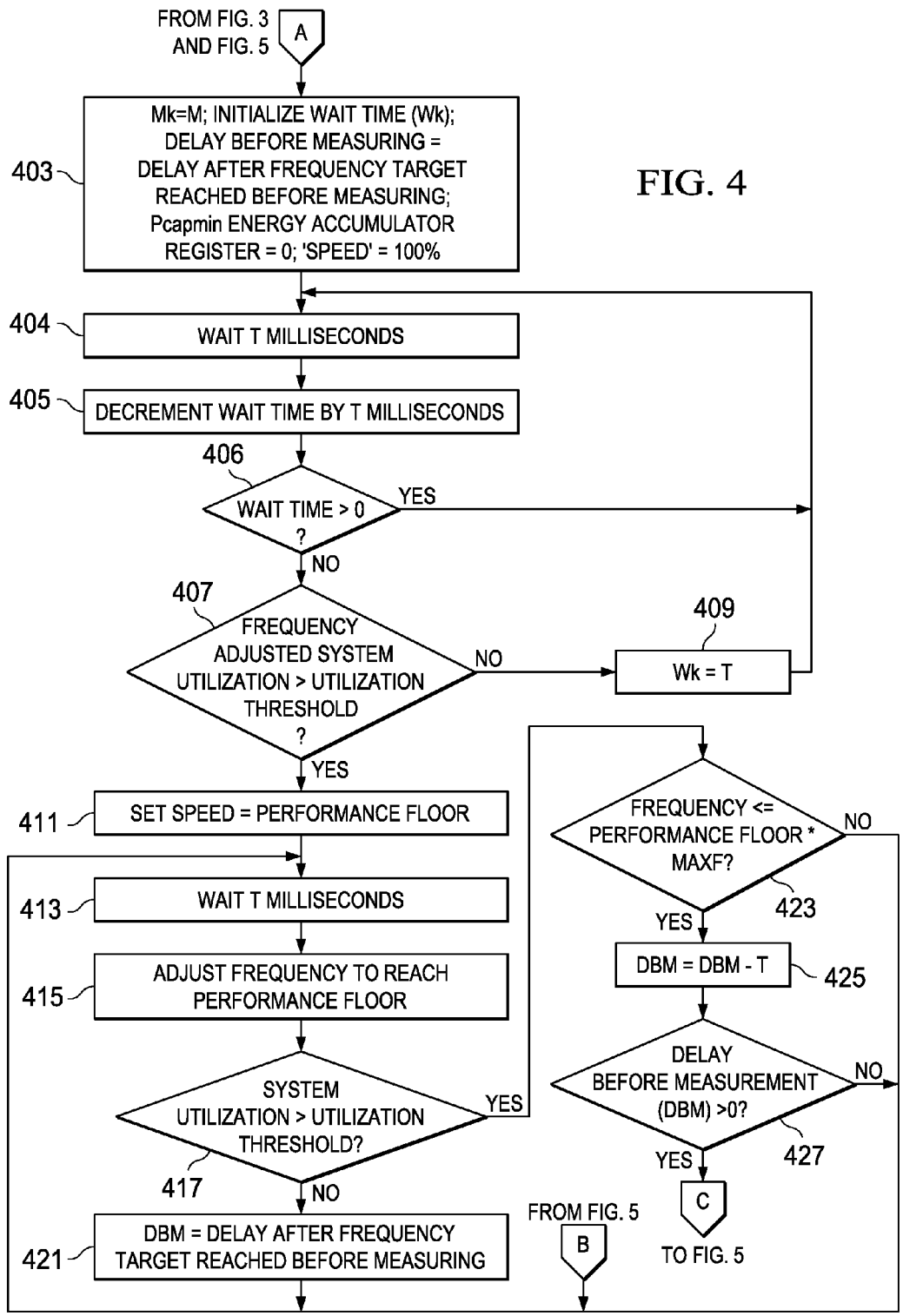
FIG. 4 is a flowchart portion of iterative steps and exit conditions for loops in accordance with an illustrative embodiment of the invention.

FIG. 4 is a flowchart portion of iterative steps and exit conditions for loops in accordance with an illustrative embodiment of the invention. Initially, some counters or other iteration measuring variables may be set (step 403). During step 403, the PMM may set a measurement counter, Mk, to the measurement interval duration, M. The PMM may initialize wait time, Wk, to the wait time to wait between attempts to calibrate, W. Further, in step 403, the PMM may set a delay before measuring to be a delay after frequency target reached before measuring. Next, the PMM may conclude step 403 by setting the PCapMin Energy Accumulation Register (PEAR) to 0. The PEAR may be used to accumulate energy measurements in units of, for example, milliJoules. The PMM may set the processor speed to 100%, or the full processor clock speed, described above.

Next, the PMM may wait a minimum amount of time, T milliseconds (step 404). T may be the power averaging interval. T may be, for example, 32. It is appreciated that other values of T may be selected, so long as in practice, the power averaging interval is sufficiently long to obtain a representative power signal. The actual sampling of power may be a sampling interval between 1 microsecond and 100 microseconds. The selection of the power averaging interval may vary in accordance with noise present on the power signal conductor. Accordingly, a higher presence of noise may lead to a designer choosing a longer power averaging interval, T.

Next, the PMM decrements the wait time, Wk, by T (step 405). Next, the PMM may determine whether the wait time is greater than 0 (step 406). If the wait time exceeds 0, then the PMM repeats steps 404 and 405.

However, if the wait time is not greater than zero, the PMM determines if the frequency adjusted system utilization exceeds the utilization threshold (step 407). A frequency adjusted system utilization is the product of a system utilization and the fraction of full processor frequency at which the blade server may currently operate. If the result of step 407 is negative, the PMM resets the wait time, Wk to T. Next, the PMM may begin a fresh exploration periodicity. For example, a negative determination of step 407 occurs between exploration periodicity 246 and exploration periodicity 247 of FIG. 2D.

However, if step 407 has a positive outcome, the PMM sets the speed to be the performance floor (step 411). Step 411, explained below, and other subsequent steps in FIG. 3 may be substeps for calibrating the server. Variables may determine a number of times that various substeps are repeated to determine if conditions warrant sampling energy use of the server, and how many samples may be suitable to determine a PCapMinNew.

Next, the PMM may wait T milliseconds (step 413). Such a modest delay may allow phase locked loops for a clock signal to stabilize. Next, the PMM adjusts a frequency to reach the performance floor (step 415). The frequency is the actual output of the phase lock loop in the clock generating circuit. The frequency then is the frequency of the clock signal that drives the integrated circuit, and thus the cores and threads dependent on the integrated circuit. Accordingly, due to delays in achieving stability, step 415 may be delayed as compared to step 411, and is a product of the physical characteristics of the clock circuit, as well as environmental factors.

Next, the PMM determines if a system utilization is greater than the utilization threshold (step 417). Step 417 may confirm that the system utilization has not dropped disproportionately as the frequency changed in step 415. System utilization is a level to which threads are utilizing cores within an integrated circuit. The system utilization may be an average utilization of all hardware threads on the integrated circuit. Such an average may take into account that an undispatched hardware thread occupies 0% of a core. In a data processing system using a Linux operating system, a 'top' command may provide system utilization.

A negative determination at step 417 may cause the PMM to set a delay before measuring to be a delay after frequency target reached before measuring or DAFTRBM (step 421). Following step 421, the PMM may repeat step 413.

However, a positive determination at step 417 may cause the PMM to determine whether the frequency or speed is less than or equal to the product of performance floor and MAXF (step 423). A negative determination at step 423 causes the PMM to repeat step 413.

Figure 5:
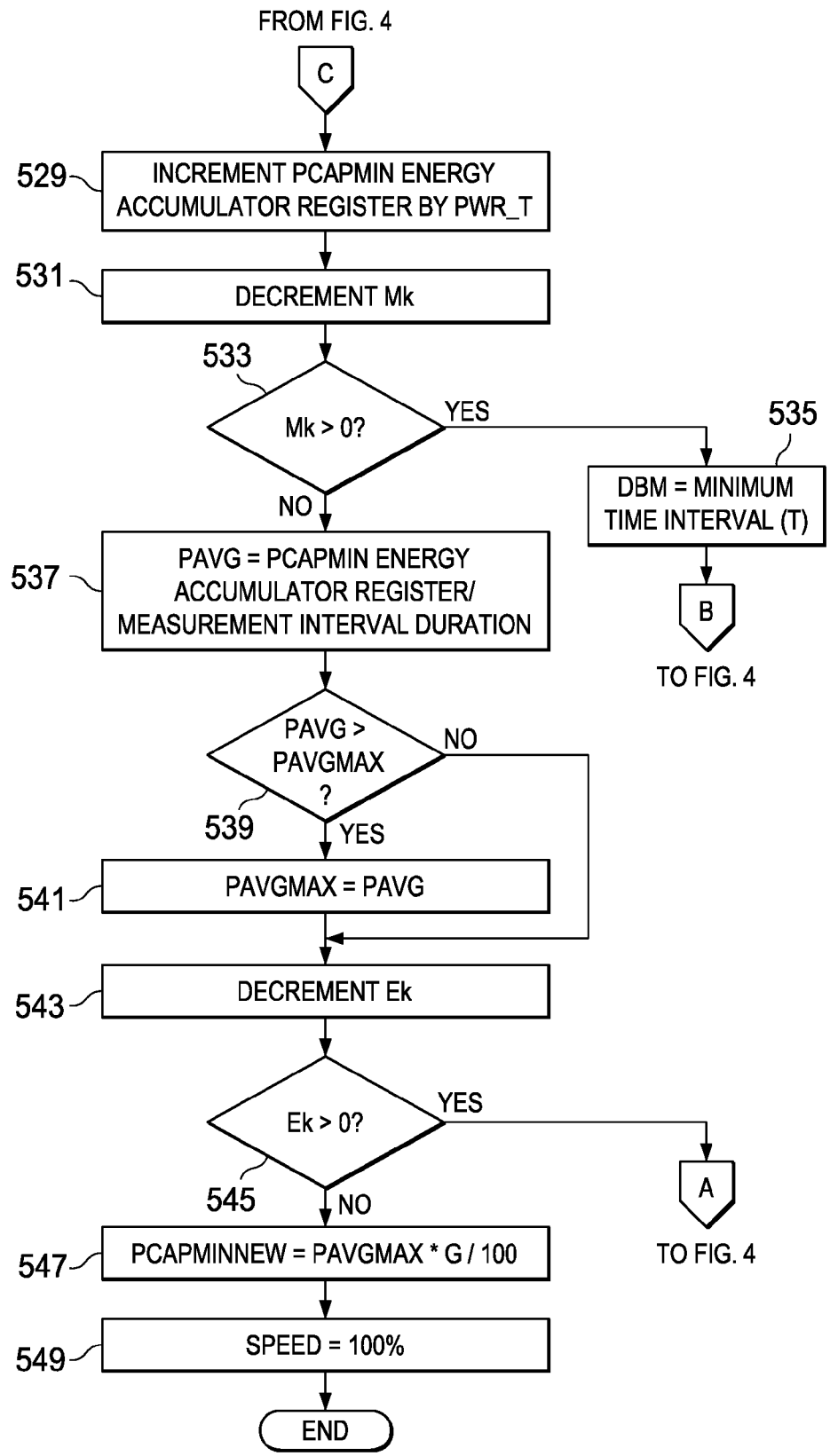
FIG. 5 is a flowchart portion of sampling, averaging and collecting of maximum values for power averaged during sampling periods or calibration periods in accordance with an illustrative embodiment of the invention.

However, a positive determination at step 423 causes the PMM to reduced the delay before measuring by a time, T (step 425). Next, the PMM determines if the delay before measurement (DBM) is greater than zero (step 427). The delay before measurement is a variable that controls a settling time for system utilization and frequency prior to measuring energy consumption of the server. A negative determination causes the PMM to repeat step 413). Otherwise, processing continues to a measurement phase of steps, as illustrated in FIG. 5. A cumulative effect of steps 427, 413, 421 among other delay-oriented steps is to allow frequency of the clock generating circuit to settle to a stable frequency before measuring utilization of a system. A negative outcome to step 427 may indicate that the frequency, and accordingly utilization may be stable enough for providing a reliable measurement.

FIG. 5 is a flowchart portion of sampling, averaging and collecting of maximum values for power averaged during sampling periods or calibration periods in accordance with an illustrative embodiment of the invention. A power average is the average of multiple power measurements, and may be calculated as dividing energy consumed by time during which the server consumes the energy. The PMM continues steps of FIG. 5 in coordination with steps shown in FIGS. 3 and 4. Initially, the PMM may increment PCapMin energy accumulator register (PEAR) by a sampled energy used by the processor, pwr_t (step 529). PEAR may carry values having units of milliJoules. Pwr_t, on the other hand, may accumulate an average power over an interval of time, or 'T'. The pwr_t may be a register or a memory that accumulates samples from an analog to digital conversion of an available current at the applicable blade server. Accordingly, pwr_t is sampled energy over a shortened interval, while PEAR is a sum of multiple pwr_t accumulations. Next, the PMM may decrement Mk (step 531). Next, the PMM determines if Mk is greater than zero (step 533). Recall, that Mk is the counter used to index a loop that counts a number of valid power samples. A positive result to step 533, causes the PMM to set the delay between measurements to be the minimum time interval, T (step 535). A further iteration through some steps of the flowchart of FIG. 4 may follow.

However, a negative determination at step 533 may cause the PMM to calculate a power average, pavg, as the PEAR divided by the measurement interval duration (step 537). Next, the PMM determines if pavg is greater than Pavgmax (step 539). If so, the PMM sets Pavgmax to pavg (step 541). Pavgmax is a provisional maximum value established from pavg values obtained during operation of the data processing system. Next, the PMM decrements Ek (step 543). A negative result to 539 also directs the PMM to decrement Ek (step 543).

Next, the PMM determines if Ek is greater than zero (step 545). Ek is greater than zero when additional measurements are to be taken to form a conclusive pavgmax for the current calibration period. As explained above, the calibration periods begin on entry from step 407 to 411). A positive result to step 545 causes the PMM to resume processing at step 403 in FIG. 4. Accordingly, the positive exit from step 545 may mark the conclusion of a calibration period, and the beginning of an exploration periodicity, in FIG. 4.

However, a negative determination to step 545 causes the PMM to set PCapMinNew to pavgmax multiplied by a guardband (step 547). PCapMinNew may be a revised setting to a Pcapmin value, for example, the lowermost 'safe' power cap in the excess range 211 of FIG. 2A. Next, the PMM may set the speed to be 100% (step 549). Accordingly, the clock speed may be established to be full processor speed. In the example given above, clock speed may be restored to 4.2 GHz. Processing may terminate thereafter.

Illustrative embodiments of the present invention may use the PCapMinNew in several ways. For example, the PCapMinNew may be used to automatically override a power cap set by a system administrator, and accordingly, recover the excess range of so that surpluses in power may be allocated elsewhere beyond the server associated with the PCapMinNew. Conversely, in instances where the pcapmin falls below the PCapMinNew determined by embodiments of the invention, one or more illustrative embodiments may cede to the processor any pooled surplus power allocated to the data center as a whole. Alternatively, the PCapMinNew may merely set a new lower limit to a range of power caps. Consequently, one or more of these treatments of PCapMinNew, an allocation of power to a server may be more accurately set to accommodate future power use on the server consistent with the configuration of the server during calibration periods. Thus, a greater level of assurance can be established that the addition or replacement of servers in a data center will not trigger over-current protections for the data center.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining a safe lower bound for a commonly powered data processing system, the method comprising:
operating the data processing system using at least one nominal operating parameter during an exploration periodicity; wherein the at least one nominal operating parameter is clock speed;
determining whether a calibration period is occurring;
calibrating the data processing system up to a measurement interval duration expiration, wherein calibrating comprises
setting the clock speed of at least one integrated circuit of the data processing system to a performance floor;
responsive to setting the clock speed, determining whether system utilization of the data processing system exceeds the utilization threshold;
allowing a delay before measurement after setting the clock speed;

responsive to allowing a delay before measurement, accumulating at least two power measurements;

averaging the at least two power measurements to form a power average;

determining whether the power average exceeds a maximum power average;

responsive to a determination that the power average exceeds the maximum power average, storing the power average as the maximum power average; and setting a minimum power cap based on the maximum power average; and repeating operating the data processing system using the at least one nominal operating parameter.

2. The computer implemented method of claim 1, further comprising:

responsive to a determination that a calibration period is occurring, determining whether a frequency adjusted system utilization of the data processing system exceeds a utilization threshold; and wherein calibrating the data processing system up to a measurement interval duration is responsive to a determination that the frequency adjusted system utilization exceeds the utilization threshold.

3. The computer implemented method of claim 1, wherein the power cap is the maximum power average multiplied by a factor greater than 1.

4. The computer implemented method of claim 1, wherein the exploration periodicity is less than five minutes, wherein the exploration periodicity is an interval between explorations.

5. The computer implemented method of claim 1, wherein the frequency adjusted system utilization is product of a system utilization and the fraction of full processor clock speed.

6. The computer implemented method of claim 1, wherein operating the data processing system comprises operating the data processing system using a clock speed substantially set to a full processor clock speed.

7. A computer program product for determining a safe lower bound for a commonly powered data processing system, the computer program product comprising: a computer readable tangible storage device having computer usable program code embodied therewith, the computer program product comprising:

computer usable program code configured to operate the data processing system using at least one nominal operating parameter during an exploration periodicity; wherein the at least one nominal operating parameter is clock speed;

computer usable program code configured to determine whether a calibration period is occurring;

computer usable program code configured to calibrate the data processing system up to a measurement interval duration expiration, wherein the computer usable program code configured to calibrate further comprises:

computer usable program code configured to set the clock speed of at least one integrated circuit of the data processing system to a performance floor;

computer usable program code configured to determine whether system utilization of the data processing system exceeds the utilization threshold, responsive to setting the clock speed;

computer usable program code configured to allow a delay before measurement after setting the clock speed;

computer usable program code configured to accumulate at least two power measurements, responsive to allowing a delay before measurement;

computer usable program code configured to average the at least two power measurements to form a power average;

computer usable program code configured to determine whether the power average exceeds a maximum power average;

computer usable program code configured to store the power average as the maximum power average, responsive to a determination that the power average exceeds the maximum power average; and computer usable program code configured to set a minimum power cap based on the maximum power average; and computer usable program code configured to repeat operating the data processing system using the at least one nominal operating parameter.

8. The computer program product of claim 7, further comprising:

computer usable program code configured to determine whether a frequency adjusted system utilization of the data processing system exceeds a utilization threshold, responsive to a determination that a calibration period is occurring; and wherein computer usable program code configured to calibrate the data processing system up to a measurement interval duration is responsive to a determination that the frequency adjusted system utilization exceeds the utilization threshold.

9. The computer program product of claim 7, wherein the power cap is the maximum power average multiplied by a factor greater than 1.

10. The computer program product of claim 7, wherein the exploration periodicity is less than five minutes.

11. The computer program product of claim 7, wherein the frequency adjusted system utilization is product of a system utilization and the fraction of full processor clock speed.

12. The computer program product of claim 7, wherein computer usable program code configured to operate the data processing system comprises computer usable program code to operate the data processing system using a clock speed substantially set to a full processor clock speed.

13. A data processing system comprising:

a bus;

a storage device connected to the bus, wherein computer usable code is located in the storage device;

a communication unit connected to the bus;

a processing unit connected to the bus, wherein the processing unit executes the computer usable code for determining a safe lower bound for a commonly powered data processing system wherein the processing unit executes the computer usable program code to operate the data processing system using at least one nominal operating parameter during an exploration periodicity; wherein the at least one nominal operating parameter is clock speed; determine whether a calibration period is occurring; calibrate the data processing system up to a measurement interval duration expiration; and repeatedly operate the data processing system using the at least one nominal operating parameter, wherein in executing computer usable code to calibrate, the processor executes computer usable code to set the clock speed of at least one integrated circuit of the data processing system to a performance floor; determine whether system utilization of the data processing system exceeds the utilization threshold, responsive to setting the clock speed; allow a delay before measurement after setting the clock speed; accumulate at least two power measurements, responsive to allowing a delay before measurement; average the at least two power measurements to form a power average; determine whether the power average exceeds a maximum power average; store the power average as the maximum power average, responsive to a determination that the power average exceeds the maximum power average; and set a minimum power cap based on the maximum power average.

14. The data processing system claim 13, further comprising executing computer usable code to determine whether a frequency adjusted system utilization of the data processing system exceeds a utilization threshold, responsive to a determination that a calibration period is occurring; and wherein in executing the computer usable code to calibrate the data processing system up to a measurement interval duration the processor is responsive to a determination that the frequency adjusted system utilization exceeds the utilization threshold.

15. The data processing system claim 13, wherein the power cap is the maximum power average multiplied by a factor greater than 1.

16. The data processing system claim 13, wherein the exploration periodicity is less than five minutes.

17. The data processing system claim 13, wherein the frequency adjusted system utilization is product of a system utilization and the fraction of full processor clock speed.

* * * * *